United States Patent [19]

Coccia

[11] 4,304,515

[45] Dec. 8, 1981

[54] TEMPERATURE SENSOR ARRANGEMENT FOR PRODUCT STORAGE BUILDING

[75] Inventor: Larry A. Coccia, Elizabeth, Pa.

[73] Assignee: Pullman Incorporated, Chicago, Ill.

[21] Appl. No.: 86,850

[22] Filed: Oct. 22, 1979

[51] Int. Cl.³ .......................... G01K 1/02; G01K 3/00
[52] U.S. Cl. .................................. 414/289; 414/326; 73/340; 73/374
[58] Field of Search ...................... 414/289, 326, 327; 73/340, 341, 343 R, 343 B, 324; 248/59, 60

[56] References Cited

U.S. PATENT DOCUMENTS

| | | | |
|---|---|---|---|
| 1,123,556 | 1/1915 | Krovetz | 73/343 |
| 1,224,385 | 5/1917 | Kennedy | 73/340 |
| 2,663,191 | 12/1953 | Brown | 73/374 |
| 2,728,068 | 12/1955 | Adams et al. | |
| 2,742,780 | 4/1956 | Feigal et al. | 73/340 X |
| 2,816,442 | 12/1957 | Burton | 73/340 |
| 3,064,245 | 11/1962 | Lindberg, Jr. | |
| 3,543,677 | 12/1970 | van der Lely | 414/326 X |
| 3,648,764 | 3/1972 | Starr | |
| 3,866,871 | 2/1975 | Dupoy, Sr. | 248/59 |
| 4,028,139 | 6/1977 | Smith et al. | 73/341 |
| 4,102,194 | 7/1978 | Eng | 73/340 |

FOREIGN PATENT DOCUMENTS

| | | | |
|---|---|---|---|
| 830197 | 12/1969 | Canada | 73/340 |
| 839476 | 6/1960 | United Kingdom | 414/326 |

*Primary Examiner*—Robert W. Saifer
*Attorney, Agent, or Firm*—Paul A. Kerstein

[57] ABSTRACT

A storage building includes a plurality of individual compartments for housing sponge iron pellets immediately after they leave a gaseous reduction vessel. The compartments include provisions for discharging the pellets to conveying means and each of the housings is provided with a temperature monitoring arrangement adapted to signal excessive temperatures occurring therein.

7 Claims, 10 Drawing Figures

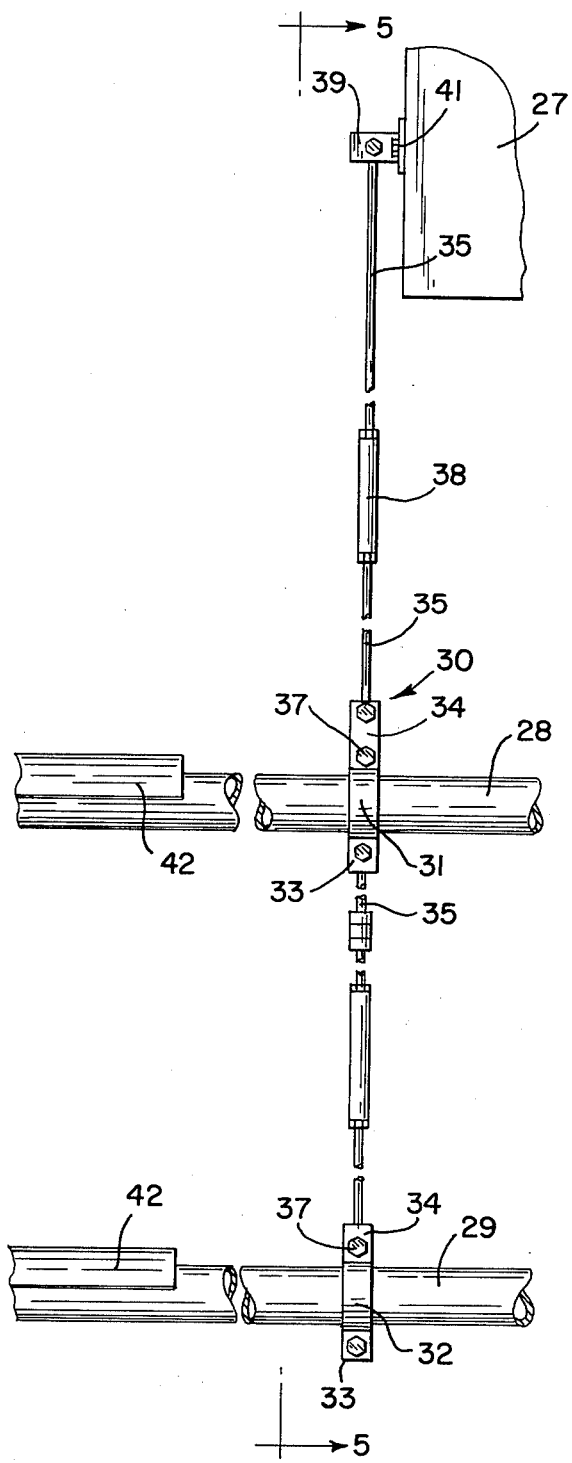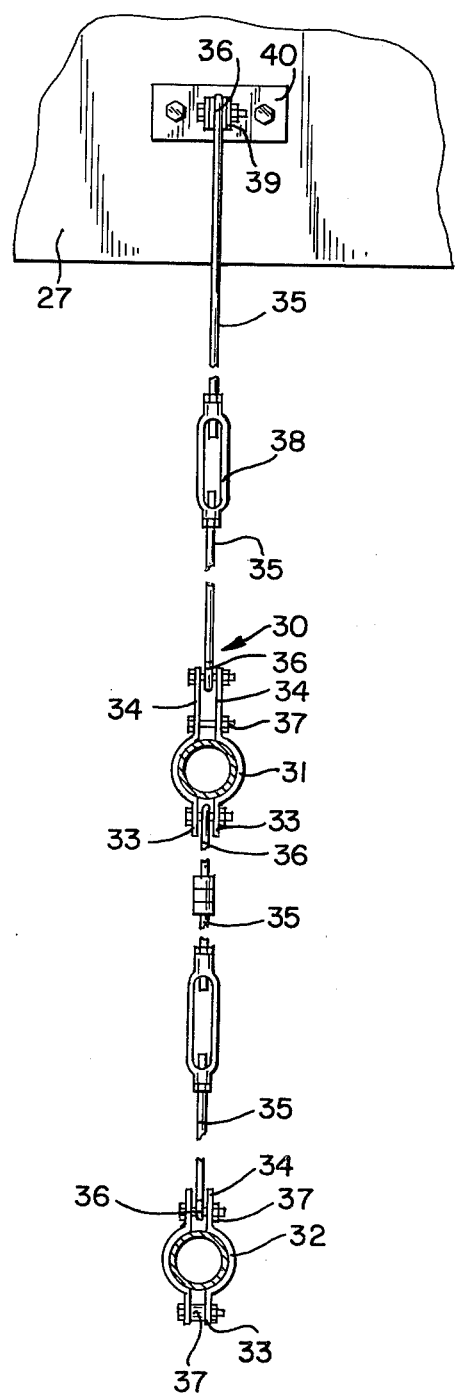

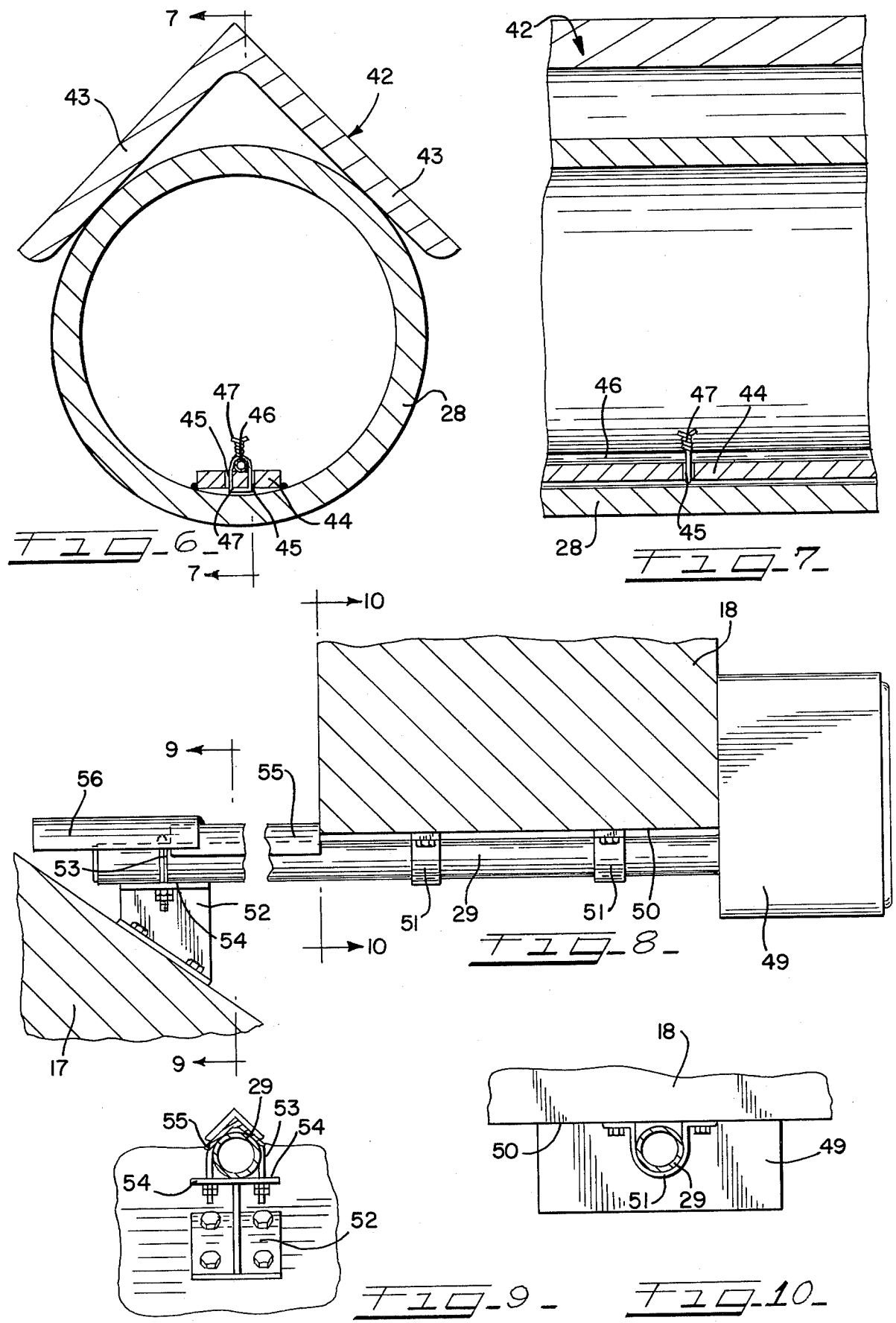

TEMPERATURE SENSOR ARRANGEMENT FOR PRODUCT STORAGE BUILDING

BACKGROUND OF THE INVENTION

1. Field of the Invention

The present invention relates to storage buildings and particularly to a specific compartmented storage housing for containment of sponge iron pellets after they leave the gaseous reduction environment.

2. Description of the Prior Art

Temperature sensors are well-known in the prior art and include such patents as U.S. Pat. No. 3,648,764 which monitors the temperature of a person's skin wearing a space suit. U.S. Pat. No. 2,728,068 discloses a fire detector which includes an alarm and U.S. Pat. No. 3,064,245 discloses a heat detection device which measures a plurality of different temperatures with a single detecting instrument. A device for measuring the temperature in a refrigerated railroad car is disclosed in U.S. Pat. No. 1,123,556, the same including a thermometer which is protected by means of a vertically extending pipe. U.S. Pat. No. 3,892,129 discloses a temperature sensing device wherein a thermal switch is connected to an expansible liquid of a capillary type, monitoring temperature within a closure or housing to which it may be connected. The present invention is an improvement over the aforementioned disclosures in that it provides for the close monitoring of a plurality of individual adjacent compartments which contain a product known as sponge iron which has a propensity for fast oxidation during the time period after which it has been manufactured in a gaseous reduction vessel. The specific arrangement and the monitoring system hereinafter disclosed is not suggested by the aforementioned references.

SUMMARY OF THE INVENTION

In the present invention a building or housing is constructed of concrete and is provided with a plurality of adjacent compartments having filler openings at their upper ends through which manufactured sponge iron pellets are delivered for storage purposes. The housing is of a particular shape especially suited for the storage of the material and for any discharge of the same when so desired. In the present invention the housing includes downwardly sloping hopper walls in each of the compartments leading to a discharge opening through which sponge iron pellets are discharged by means of a screw-type conveyor onto an endless conveyor belt which delivers the same to the particular location desired. Each of the compartments includes a monitoring or temperature sensing arrangement which comprises upper and lower horizontal extending and laterally spaced pipes suspended from a top beam structure by a plurality of hangers. The hangers are vertically adjustable within the sponge iron pellets contained in the building. Each of the pipes is provided with longitudinally extending capillary tubes communicating at opposite ends of the pipe with electrical boxes adapted to be connected to a suitable signalling or monitoring system calling attention to the fact that certain areas of the compartments include pellets which may be overheating beyond a predetermined temperature.

BRIEF DESCRIPTION OF THE DRAWINGS

FIG. 4 is a side elevational view of a hanger for supporting a pipe and capillary tube arrangement;

FIG. 5 is a view taken substantially along the line 5—5 of FIG. 4;

FIG. 6 is a cross-sectional view taken substantially along the line 6—6 of FIG. 3;

FIG. 7 is a cross-sectional view taken substantially along the line 7—7 of FIG. 6;

FIG. 8 is an enlarged cross-sectional view through a portion of the storage building showing a lower pipe and capillary tube support arrangement;

FIG. 9 is a cross-sectional view taken substantially along the line 9—9 of FIG. 8; and FIG. 10 is a cross-sectional view taken substantially along the line 10—10 of FIG. 8.

DESCRIPTION OF THE PREFERRED EMBODIMENT

Figure 1:
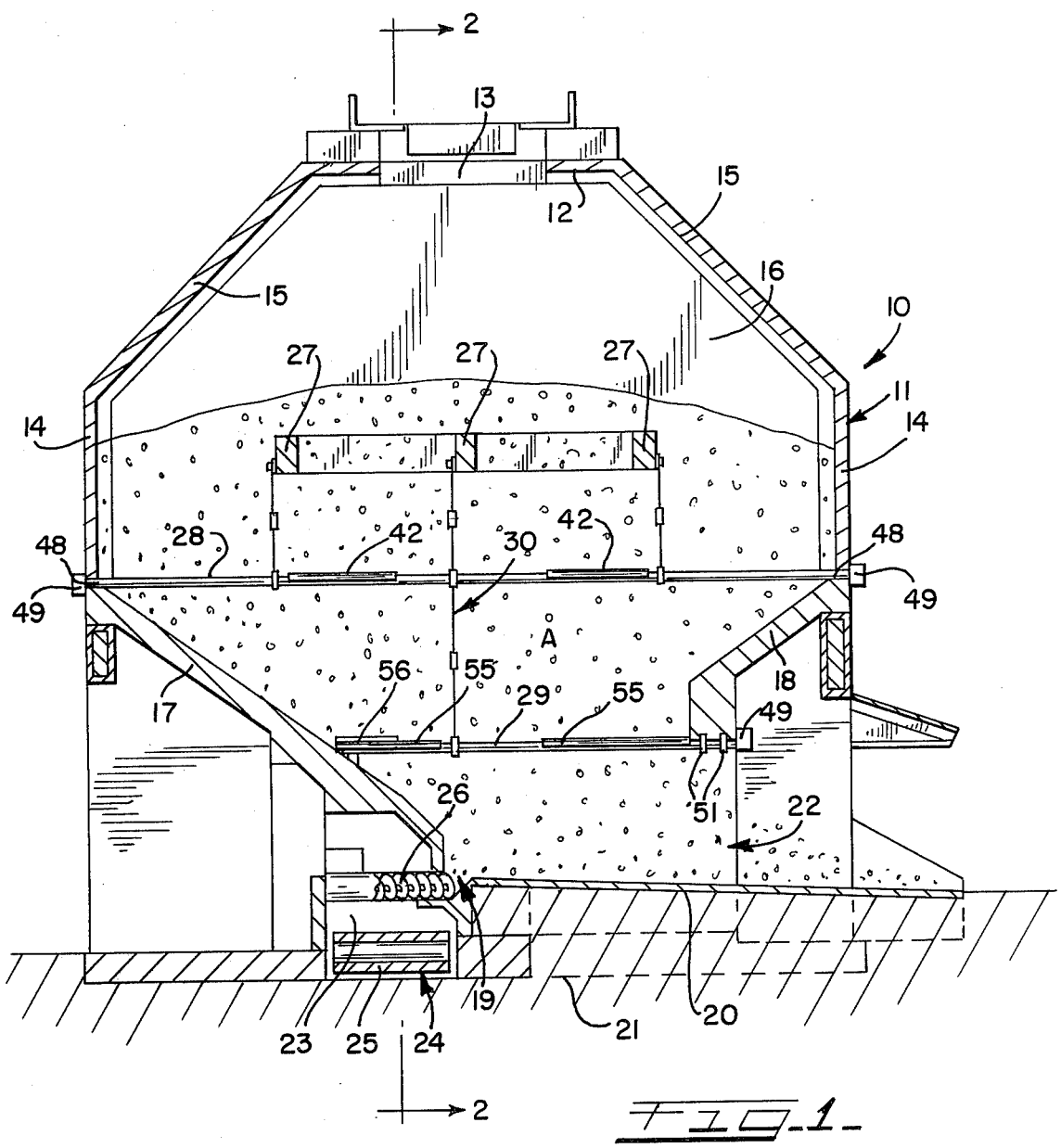
FIG. 1 is a cross-sectional view through a storage building containing a heat temperature sensing arrangement.
Figure 2:
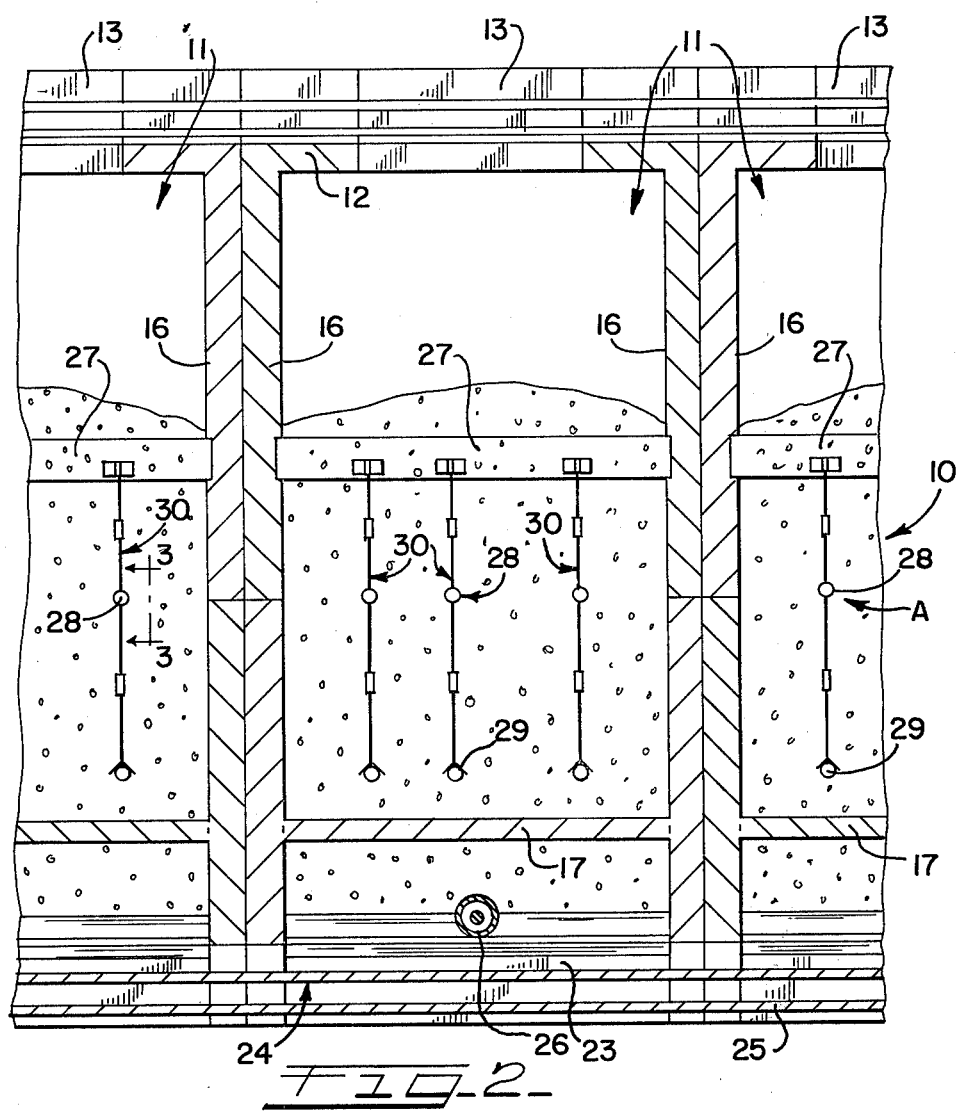
FIG. 2 is a cross-sectional view taken substantially along line 2—2 of FIG. 1.
Figure 3:
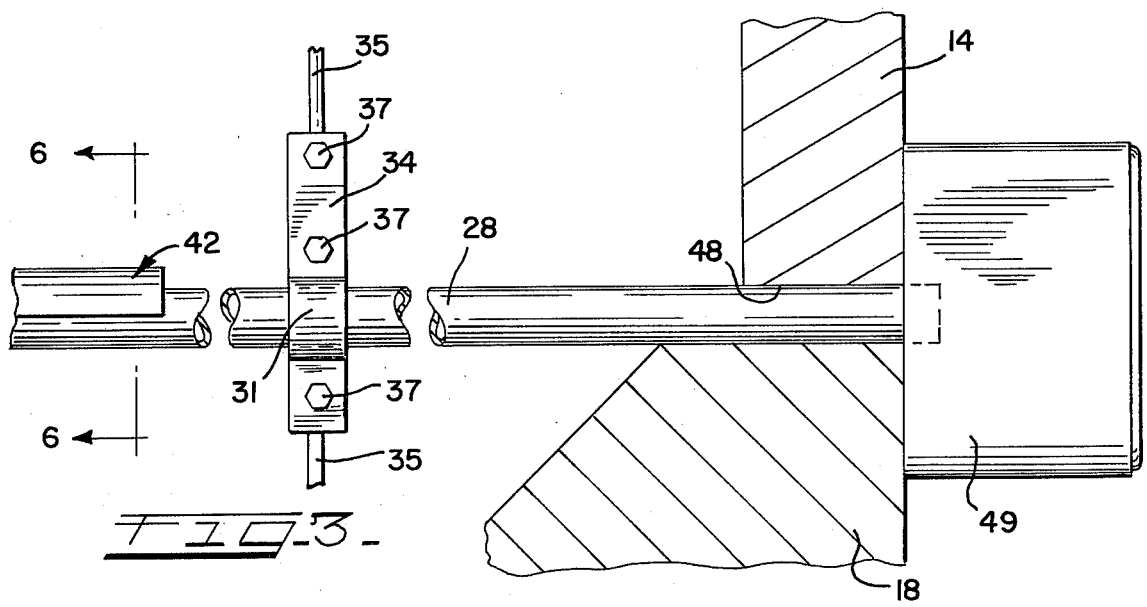
FIG. 3 is a cross-sectional view taken substantially along the line 3—3 of FIG. 2.

Referring now particularly to FIGS. 1 and 2 a concrete housing or building structure 10 includes a plurality of individual compartments or hoppers 11 constructed in contiguous and adjacent arrangement. Each individual hopper 11 includes an upper wall 12 having a filler opening 13. The upper wall 12 is connected to side walls 14 also integral with concrete upper sloping side wall portions 15. The compartments or hoppers 11 further include end walls 16. As first shown in FIG. 1 the left hand side wall 14 is integral with a downwardly and inwardly extending concrete wall portion 17 providing a sloping surface for the product to be contained within the housing. A relatively shorter opposed sloping wall 18 is provided on the other side of the housing. A discharge opening generally designated at 19 is provided at the lower end of the sloping wall 17 adjacent to a lower wall 20 which is suitably supported on a foundation or footing structure generally designated at 21. As best shown the wall 18 terminates a distance upwardly from the lower wall 20 to provide a space 22 open to the atmosphere.

The concrete housing structure 10, as best shown in FIG. 1 is provided with a horizontally extending conveyor space 23 which, also as shown in FIG. 2 is positioned adjacent to and below the individual compartments 11. The space 23 supports therein a conveyor 24 including an endless belt 25 which product is discharged by means of a screw type discharge conveyor 26. The conveyor 26 is supported in a manner adjacent to the discharge opening 19 so that product designated at A housed within each of the compartments may be discharged onto the conveyor which conveys the same to its ultimate destination.

A heat monitoring or temperature sensing arrangement is provided within each of the hoppers 11. As best shown in FIGS. 1 and 2 the arrangement includes three upper horizontal pipes 28 and three horizontal pipes 29, the same being horizontally spaced relative to each other and being submerged or embedded within the product A when the bins are substantially filled. The pipes 28 and 29 are suspended within each of the compartments by means of hangers 30 which are connected at their upper ends to horizontally extending concrete support beams 27, the same as best shown in FIG. 1 being disposed below the filler openings 13. Each of the hangers 30 includes an upper collar 31 and a lower collar 32. Referring particularly to FIGS. 4 and 5 the collars 31 support the pipes 28 and collars 32 support pipes 29. The collars 31 and 32 are of the split clevis type including outwardly extending flanges 33 and 34 connected together by suitable bolt and nut connections 37. Links 35 include at one end connector eyes 36 secured to fasteners 37 and are provided at their other ends with suitable threads connected to threaded turnbuckles 38 of conventional construction. The hangers 30 are suspended from spaced bracket ears 39 by suitable fasteners, the said ears 39 being connected to bracket plates 40 connected to the beams 27 by means of fasteners 41. Thus, by virtue of the turnbuckle and linkage arrangement it is apparent that the hangers are adjustable for maintaining the proper height desired with respect to the pipes 28 and 29.

As best shown in FIGS. 1 and 6 the upper pipes 28 include deflector members 42 which are angle shaped and include flanges 43 suitably welded to the pipes 28 for securing them. The deflector members 42 are disposed underneath the filler opening 13 and protect the piping arrangement from the dropping sponge iron pellets, thereby protecting the pipes. Lower pipes 29 are also protected in a similar manner by similar flanged deflectors 55.

As best shown in FIGS. 6 and 7 each of the tubes 28 includes a longitudinally extending rectangular plate or bar 44 which may be suitably welded to the lower inside horizontal surface of each of the pipes and these support a longitudinally extending capillary tube 46. Suitable wire ties 47 project through openings 45 in the plate 44 and firmly connect the capillary tubes 46 in position along the length of the plate 44 and pipe 28. The pipes 29 include a similar arrangement. As best shown in FIGS. 1 and 2 the side walls 14 also include openings 48 through which the upper pipes 28 extend and which in turn are suitably connected at each of their ends to a suitable electrical connector box 49 which, in turn, may be connected in conventional fashion to a signalling means, etc., for monitoring the heat rise in temperature of the material contained within the housing.

As best shown in FIGS. 8, 9 and 10, the wall 18 includes the lower horizontal surface 50 to which ends of the tubes 29 are connected by means of brackets 51. The other ends of the tubes 29 are suitably supported on brackets 52 on the wall 17. The said brackets 52 have connected thereto U-bolts 53 which clamp the ends of the tubes 29 to ears 54 of the brackets 52, the same being best shown in FIG. 9. The pipes 29 also include diagonal-shaped deflectors 55 identical in shape to the deflectors 42. As best shown in FIG. 8 a stub shield 56 is suitably welded to one of the deflectors 55, in turn supported on the bracket 52.

THE OPERATION

In the process of discharging sponge iron from a gaseous reduction vessel the sponge iron pellets are conveyed to the building disclosed and are discharged into the compartments through filler openings 13. The housing is vented to the atmosphere through the opening 22 and the material as it descends downwardly through the beams 27 is deflected from the pipes 28 and 29 by means of the deflectors 55. Sponge iron has the inherent characteristic of having high oxidation and spontaneous combustion can occur during the storing of the product. If this were to occur, it would have an adverse effect on the entire product contained within the bin and thus it is necessary to monitor the heat or temperature of the sponge iron at various locations within the individual compartments so that a signal can alert the operator and proper steps can be taken to obviate the problem. The signalling means may be connected to the electrical connector boxes 49 and may include devices which will correct the problem or which will merely signal the problem to the operator. Devices which will provide electrical switching in response to the action of the capillary tubes would include the prior art such as U.S. Pat. No. 3,892,129 patented July 1, 1975. Devices to provide this function are conventional in the prior art and are available through conventional commercial sources.

Product from the individual compartments can be discharged by means of the motorized auger 26 onto the conveyor belt 25 which, in turn, will deliver the product to the desired station.

What is claimed is:

1. In a product storage housing including interconnected side, end, top and bottom walls,
    said top wall including a filler opening and said bottom wall including a discharge opening, the improvement of a product temperature sensing arrangement comprising;
    a tubular structure, including a plurality of pipes suspended within said housing and extending horizontally therein and being horizontally and vertically spaced relative to one another,
    means supporting said tubular structure on said walls, whereby said tubular structure is imbedded in the product contained in said housing,
    suspension means for said pipes comprising horizontally extending beams supported on certain of said walls and vertically adjustable hanger members connected to said beams and said pipes for supporting the same,
    deflector shields connected to said pipes for deflecting product therefrom entering through said filler opening,
    temperature sensing means within said tubular structure including capillary tubes supported within said pipes,
    and means connected to said sensing means extending outwardly of said housing for indicating the temperature of the product therein.

2. The invention in accordance with claim 1, said housing including downwardly and inwardly sloping walls, one of said sloping walls terminating adjacent said discharge opening,
    and mechanical feeding means on said housing adjacent said discharge opening for discharging product material from said housing.

3. The invention in accordance with claim 2, including conveyor means associated with said feeding means for conveying product from said housing.

4. The invention in accordance with claim 1
    said deflector shields including angle shaped members having flanges connected to said upper surfaces of said pipes and positioned to deflect material laterally from and downwardly relative to said pipes.

5. The invention in accordance with claim 1, said hanger members including upper and lower collars connected to said pipes, and vertically adjustable link members inconnecting said collars and being connected to said beams.

6. The invention in accordance with claim 5, said vertically adjustable link members being interconnected by turnbuckles.

7. The invention in accordance with claim 1, and means for supporting said capillary tubes within said tubular structure comprising a plurality of wire tier firmly connecting said tubes to said pipes.

* * * * *